(12) United States Patent
Ichikawa

(10) Patent No.: US 11,292,350 B2
(45) Date of Patent: Apr. 5, 2022

(54) VEHICLE AND CHARGING SYSTEM

(71) Applicant: Toyota Jidosha Kabushiki Kaisha, Toyota (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 143 days.

(21) Appl. No.: 16/521,017

(22) Filed: Jul. 24, 2019

(65) Prior Publication Data

US 2020/0122594 A1   Apr. 23, 2020

(30) Foreign Application Priority Data

Oct. 18, 2018 (JP) .............................. JP2018-196514

(51) Int. Cl.
| | |
|---|---|
| *H02J 7/00* | (2006.01) |
| *B60L 53/16* | (2019.01) |
| *B60L 53/10* | (2019.01) |
| *H02J 7/02* | (2016.01) |
| *B60L 53/60* | (2019.01) |

(52) U.S. Cl.
CPC ............... *B60L 53/16* (2019.02); *B60L 53/11* (2019.02); *B60L 53/60* (2019.02); *H02J 7/0031* (2013.01); *H02J 7/027* (2013.01); *H02J 2207/40* (2020.01)

(58) Field of Classification Search
CPC ....................................................... B60L 53/16
USPC ......................................................... 320/109
See application file for complete search history.

(56) References Cited

U.S. PATENT DOCUMENTS

| | | | | |
|---|---|---|---|---|
| 2010/0301810 A1* | 12/2010 | Biondo | ..................... | H04Q 9/00 320/155 |
| 2012/0319648 A1* | 12/2012 | Ohtomo | .................. | B60L 50/66 320/109 |
| 2013/0110340 A1* | 5/2013 | Park | ........................ | B60L 53/14 701/22 |
| 2013/0134937 A1* | 5/2013 | Umeda | ................... | B60L 53/18 320/109 |
| 2014/0091764 A1* | 4/2014 | Kinomura | ............... | B60L 53/16 320/109 |

(Continued)

FOREIGN PATENT DOCUMENTS

| | | |
|---|---|---|
| EP | 2716490 A1 | 4/2014 |
| EP | 3351422 A1 | 7/2018 |

(Continued)

OTHER PUBLICATIONS

Machine Translation of CN207747760 U, (Year: 2018).*

*Primary Examiner* — Samuel Berhanu
(74) *Attorney, Agent, or Firm* — Dinsmore & Shohl LLP

(57) ABSTRACT

A vehicle includes a charging inlet, a power storage device, a charging device, and an output device. The charging inlet is compatible with both an alternating-current charging connector and a direct-current charging connector. The charging device is configured to charge the power storage device with at least one of an alternating-current power which are input from the charging inlet and a direct-current power which are input from the charging inlet. The output device is configured to output a notification signal for notifying whether the charging device is compatible with alternating-current charging. The alternating-current is charging of the power storage device with the alternating-current power.

9 Claims, 8 Drawing Sheets

(56) References Cited

U.S. PATENT DOCUMENTS

2014/0225441 A1* 8/2014 Mizuno .................. B60L 55/00
307/66
2015/0137755 A1   5/2015 Sadano et al.

FOREIGN PATENT DOCUMENTS

| JP | 2011-130646 A | 6/2011 |
| JP | 5359854 B2 | 12/2013 |
| JP | 2015-100185 A | 5/2015 |
| WO | 2011/078388 A1 | 6/2011 |

* cited by examiner

VEHICLE AND CHARGING SYSTEM

CROSS-REFERENCE TO RELATED APPLICATIONS

This application claims priority to Japanese Patent Application No. 2018-196514 filed on Oct. 18, 2018, which is incorporated herein by reference in its entirety it the specification, drawings and abstract.

BACKGROUND

1. Technical Field

The disclosure relates to a vehicle and a charging system and more particularly to a vehicle including a charging device that can charge a power storage device and a charging system for the vehicle.

2. Description of Related Art

A charging inlet for a vehicle that is compatible with both an alternating-current (AC) charging connector and a direct-current (DC) charging connector, for example, an inlet compatible with the Combined Charging System (CCS, which is also referred to as "combo") standard, is known (for example, see Japanese Unexamined Patent Application Publication No. 2015-100185 (JP 2015-100185 A)). It has been considered that an AC charging function is provided as an option in such a vehicle.

SUMMARY

However, in a vehicle compatible with DC charging in which a charging inlet of the CCS standard is mounted, even when a user selects an AC charging function, there is concern that no AC charging device is provided and thus AC charging is not possible, but a user will erroneously connect a charging corrector of an AC charging stand to the charging inlet.

The disclosure serves to prevent a user from erroneously connecting a charging connector to a charging inlet.

A first aspect of the present disclosure is a vehicle. The vehicle includes a charging inlet, a power storage device, a charging device, and an output device. The charging inlet is compatible with both an alternating-current charging connector and a direct-current charging connector. The charging device is configured to charge the power storage device with at least one of an alternating-current power which are input from the charging inlet and a direct-current power which are input from the charging inlet. The output device is configured to output a notification signal for notifying whether the charging device is compatible with alternating-current charging. The alternating-current charging is charging of the power storage device with the alternating-current power.

With this configuration, it is notified whether the charging device of the vehicle is compatible with the alternating-current charging. As a result, it is possible to prevent a user from erroneously connecting a charging connector to a charging inlet.

The vehicle may further include a notification device. The output device may be configured to output the notification signal for notifying whether the charging device is compatible with the alternating-current charging using the notification device based on a result of determination of whether the charging device is compatible with the alternating-current charging.

With this configuration, whether the charging device is compatible with the alternating-current charging is notified by the notification device based on the result of determination of whether the charging device is compatible with the alternating-current charging. As a result, it is possible to prevent a user from erroneously connecting a charging connector to a charging inlet.

In the above vehicle, the output device may be configured to output the notification signal for notifying whether the charging device is compatible with the alternating-current charging using an external device to the external device based on a result of determination of whether the charging device is compatible with the alternating-current charging.

With this configuration, the result of determination of whether the charging device is compatible with the alternating-current charging is notified by the external device. As a result, it is possible to prevent a user from erroneously connecting a charging connector to a charging inlet.

The vehicle may further include a notification device. The output device may be configured to detect connection of the alternating-current charging connector to the charging inlet. The output device may be configured to output the notification signal for notifying that the alternating-current charging connector is erroneously connected using the notification device when the charging device is not compatible with the alternating-current charging and the output device detects connection of the alternating-current charging connector.

With this configuration, when the charging device is not compatible with the alternating-current charging and connection of the alternating-current charging connector is detected, that the AC charging connector is erroneously connected is notified by the notification device. As a result, it is possible to notify a user that the user erroneously connects a charging connector to a charging inlet.

A second aspect of the present disclosure is a charging system. The charging system includes a vehicle including a charging inlet, a power storage device, a charging device, and an output device and a charging stand configured to charge the vehicle. The charging inlet is compatible with both an alternating-current charging connector and a direct-current charging connector. The charging device is configured to charge the power storage device with at least one of an alternating-current power which are input from the charging inlet and a direct-current power which are input from the charging inlet. The output device is configured to output a notification signal for notifying whether the charging device is compatible with alternating-current charging to the charging stand. The alternating-current charging is charging of the power storage device with the alternating-current power. The charging stand includes a notification device configured to notify whether the vehicle is compatible with the alternating-current charging based on the notification signal from the vehicle.

With this configuration, whether the vehicle is compatible with the alternating-current charging is notified by the charging stand. As a result, it is possible to prevent a user from erroneously connecting a charging connector to a charging inlet.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
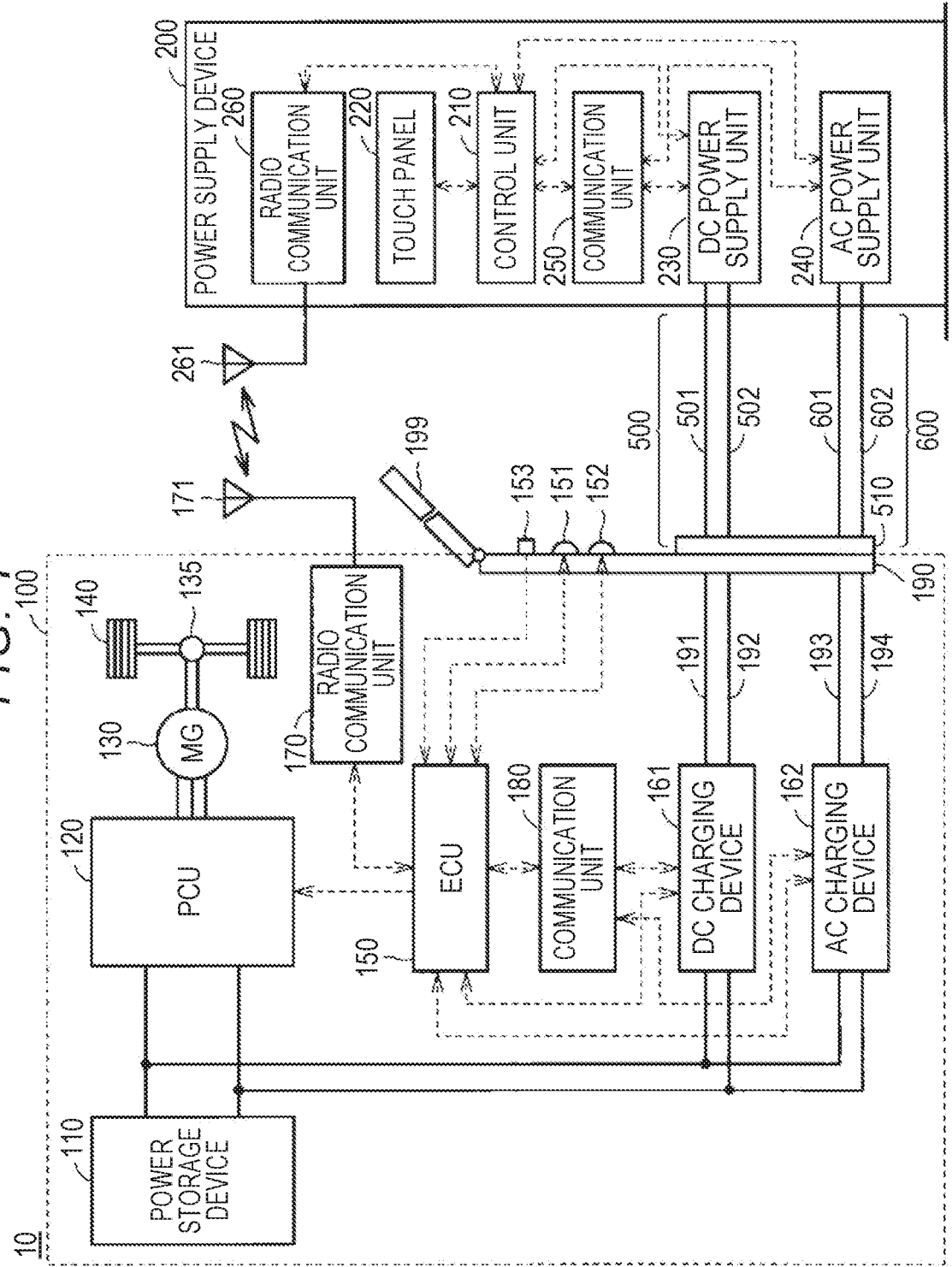
FIG. 1 is a first diagram schematically illustrating the entire configuration of a charging system according to an embodiment.

Hereinafter, embodiments of the disclosure will be described in detail with reference to the accompanying drawings. The same or corresponding elements in the drawings will be referred to by the same reference signs and description thereof will not be repeated.

FIG. 1 is a first diagram schematically illustrating the entire configuration of a charging system 10 according to an embodiment. Referring to FIG. 1, the charging system 10 includes a vehicle 100 and a power supply device 200. The power supply device 200 is installed in a place in which the vehicle 100 can be parked and charged.

The vehicle 100 is a motor-driven vehicle and can be subjected to charging (AC charging and DC charging) by connection to the power supply device 200. AC charging is charging with AC power. DC charging is charging with DC power. In this embodiment, it is assumed that the vehicle 100 is compatible with the Combined Charging System (CCS, which is also referred to as "combo") standard. However, the vehicle 100 has only to be compatible with a standard of charging corresponding to both AC charging and DC charging and may be compatible with, for example, standards (Type2(AC), Type2DC-mid) of Mennekes Elektrotechnik GmbH & Co. KG.

The power supply device 200 can be compatible with both AC charging and DC charging. The power supply device 200 may be compatible with one of AC charging and DC charging.

The vehicle 100 includes a power storage device 110, a power control unit (PCU) 120, a motor generator 130, a power transmission gear 135, driving wheels 140, an electronic control unit (ECU) 150, a DC charging device 161, an AC charging device 162, a radio communication unit 170, a communication unit 180, and a charging inlet 190.

The power storage device 110 is configured to be chargeable and dischargeable. The power storage device 110 includes, for example, a secondary battery such as a lithium-ion battery or a nickel-hydride battery. The power storage device 110 may be a battery using a liquid material as an electrolyte or may be a battery using a solid material as an electrolyte (a so-called all-solid battery). The power storage device 110 may include a power storage element such as an electric double-layer capacitor. The power storage device 110 supplies electric power for generating a driving force of the vehicle 100 to the PCU 120. The power storage device 110 stores electric power which is generated by the motor generator 130.

The PCU 120 is connected to the power storage device 110 via a power line. The PCU 120 is controlled in accordance with a control signal from the ECU 150 and converts a direct-current (DC) power from the power storage device 110 into an alternating-current (AC) power for driving the motor generator 130 or converts an AC regenerative power from the motor generator 130 into a DC power for charging the power storage device 110.

The motor generator 130 is an AC rotary electric machine and is, for example, a permanent magnet type synchronous electric motor including a rotor in which a permanent magnet is embedded. The motor generator 130 is connected to the PCU 120 via a power line. The rotor of the motor generator 130 is mechanically connected to the driving wheels 140 via the power transmission gear 135. The motor generator 130 can generate electric power using a rotational force of the driving wheels 140 at the time of a regenerative braking operation of the vehicle 100.

The ECU 150 includes a central processing unit (CPU), a memory, and an input/output buffer of which none is illustrated, and executes a variety of controls in the vehicle 100. These controls are not limited to processing based on software and may be executed by constructing dedicated hardware (an electronic circuit).

The DC charging device 161 is connected to the power storage device 110 and the PCU 120 via power lines. The DC charging device 161 is controlled in accordance with a control signal from the ECU 150, converts a voltage of a DC power from the power supply device 200 into a voltage of the power storage device 110, and charges the power storage device 110.

The AC charging device 162 is connected to the power storage device 110 and the PCU 120 via power lines. The AC charging device 162 is controlled in accordance with a control signal from the ECU 150, converts an AC power from the power supply device 200 into a DC power, converts the voltage thereof into a voltage of the power storage device 110, and charges the power storage device 110.

The radio communication unit 170 is controlled by the ECU 150 and performs radio communication with the power supply device 200 via an antenna 171. The radio communication unit 170 is constituted by, for example, a digital communication module (DCM).

The communication unit 180 is controlled by the ECU 150 and performs power line communication (PLC) with the power supply device 200 via one of power lines 191 to 194. The communication mode of the communication unit 180 is not limited to PLC and may be a mode of communication (hereinafter also referred to as "CAN communication") based on a controller area network (CAN) communication protocol.

The charging inlet 190 is compatible with both an AC charging connector and a DC charging connector and has a shape corresponding to the CCS standard in this embodiment. The charging inlet 190 is connected to the DC charging device 161 via the power lines 191 and 192 and is connected to the AC charging device 162 via the power lines 193 and 194.

Figure 4:
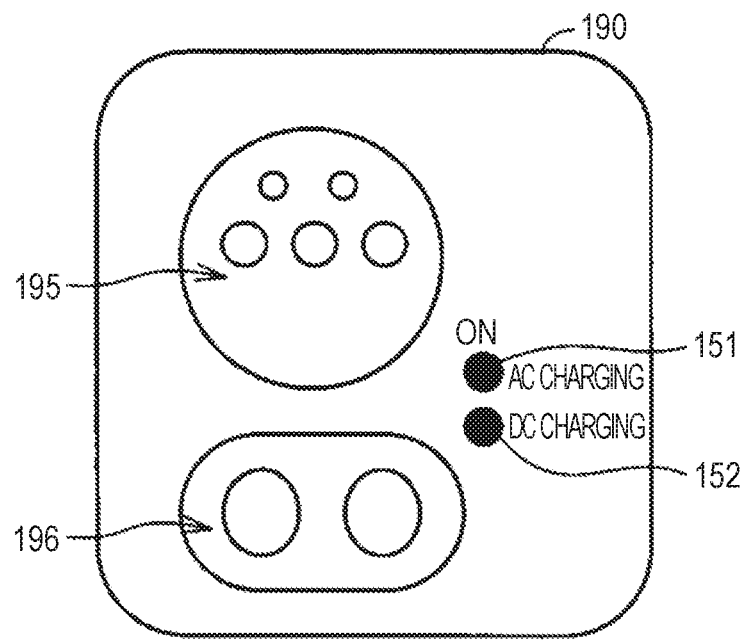
FIG. 4 is a diagram illustrating a notification mode using a charging inlet when there is an AC charging function according to the first embodiment.

As illustrated in FIG. 4 which will be described later or the like, an AC charging indicator 151 and a DC charging indicator 152 are provided in the charging inlet 190, and a charging lid 199 and an opening/closing sensor 153 that detects opening or closing of the charging lid 199 are also provided therein.

The charging lid 199 is a lid that shields the charging inlet 190. The charging lid 199 is opened to enable a charging connector 510 to be connected to the charging inlet 190 at the time of charging, and is closed to prohibit the charging connector 510 from being connected to the charging inlet 190 at the time of non-charging.

The opening/closing sensor 153 transmits a detection signal indicating that the charging lid 199 is open to the ECU 150 in a state in which the charging lid 199 is open, and transmits a detection signal indicating that the charging lid 199 is closed to the ECU 150 in a state in which the charging lid 199 is closed.

The AC charging indicator 151 is a lamp that is controlled in accordance with a control signal from the ECU 150 and indicates whether the vehicle 100 is compatible with AC charging. The AC charging indicator 151 indicates that the vehicle 100 is compatible with AC charging when it is turned on, and indicates that the vehicle 100 is not compatible with AC charging when it is turned off.

The DC charging indicator 152 is a lamp that is controlled in accordance with a control signal from the ECU 150 and indicates whether the vehicle 100 is compatible with DC charging. The DC charging indicator 152 indicates that the vehicle 100 is compatible with DC charging when it is turned on, and indicates that the vehicle 100 is not compatible with DC charging when it is turned off.

The power supply device 200 includes a control unit 210, a touch panel 220, a DC power supply unit 230, an AC power supply unit 240, a communication unit 250, a radio communication unit 260, and a power cable. The power cable includes a DC power cable 500 and an AC power cable 600.

The DC power cable 500 includes power lines 501 and 502. In a state in which the charging connector 510 is connected to the charging inlet 190, the power lines 501 and 502 of the DC power cable 500 are connected to the power lines 191 and 192 of the vehicle 100. Accordingly, the DC power supply unit 230 of the power supply device 200 and the DC charging device 161 of the vehicle 100 are electrically connected to each other and DC charging becomes possible.

The AC power cable 600 includes power lines 601 and 602 and a signal line which is not illustrated. In a state in which the charging connector 510 is connected to the charging inlet 190, the power lines 601 and 602 of the AC power cable 600 are connected to the power lines 193 and 194 of the vehicle 100. Accordingly, the AC power supply unit 240 of the power supply device 200 and the AC charging device 162 of the vehicle 100 are electrically connected to each other and AC charging becomes possible.

The charging connector 510 is provided at ends of the DC power cable 500 and the AC power cable 600. The charging connector 510 can be connected to the charging inlet 190. The shape of the charging connector 510 includes a part that is connected to an AC charging inlet portion 195 illustrated in FIG. 4 which will be described later and a part that is connected to a DC charging inlet portion 196 illustrated in the drawing. Accordingly, when the vehicle 100 can be compatible with both AC charging and DC charging, one power selected from an AC power and a DC power can be supplied from the power supply device 200 via the charging connector 510.

When the power supply device is compatible with only DC charging, the shape of the charging connector is the same as the shape of the charging connector 510, and the DC power cable 500 and the signal line included in the AC power cable 600 is connected to the charging connector.

Figure 12:
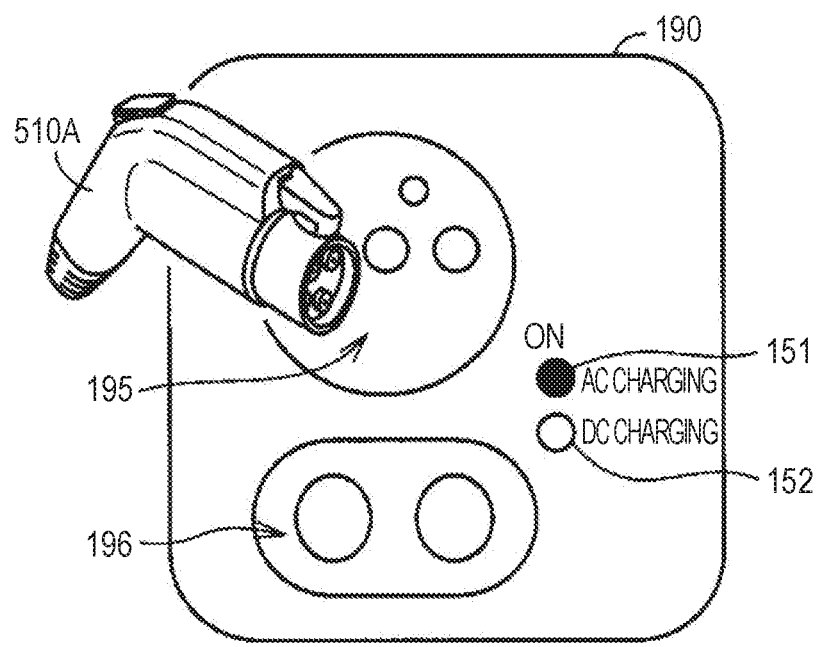
FIG. 12 is a diagram illustrating a notification mode using a charging inlet when there is an AC charging function according to the third embodiment.
Figure 13:
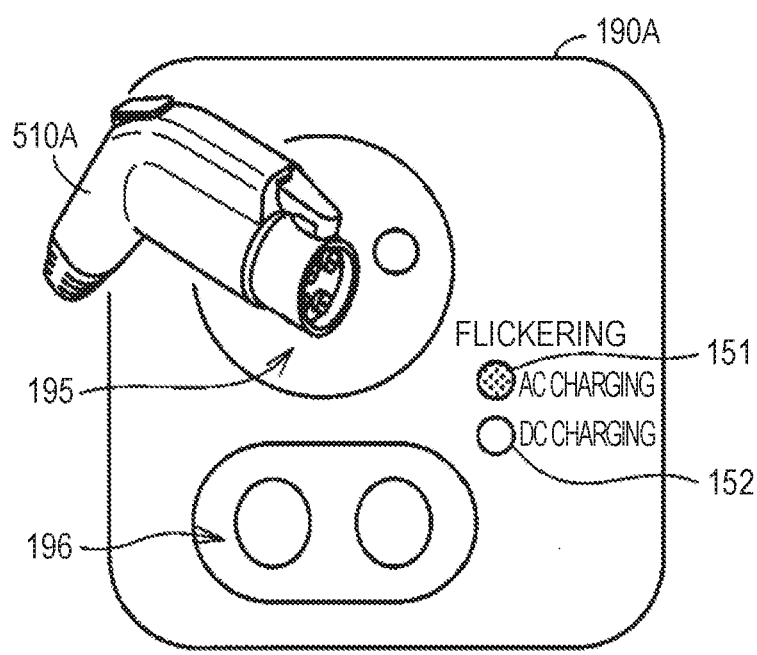
FIG. 13 is a diagram illustrating a notification mode using the charging inlet when there is no AC charging function according to the third embodiment.

When the power supply device is compatible with only AC charging, the shape of the charging connector includes a part that is connected to the AC charging inlet portion 195 illustrated in FIG. 4 which will be described later and does not include a part that is connected to the DC charging inlet portion 196 illustrated in FIG. 4 and only the AC power cable 600 is connected to the charging connector as illustrated in FIGS. 12 and 13 which will be described later.

The control unit 210 includes a central processing unit (CPU), a memory, and an input/output buffer of which none is illustrated, and executes a variety of controls in the power supply device 200. These controls are not limited to processing based on software and may be executed by constructing dedicated hardware (an electronic circuit).

The touch panel 220 is controlled by the control unit 210, displays a variety of information on a screen, and outputs a detection signal indicating what part of the screen a user has touched to the control unit 210.

The DC power supply unit 230 is controlled by the control unit 210 and supplies a DC power to the vehicle 100 via the DC power cable 500 and the charging connector 510 while controlling a current value and a voltage value. The AC power supply unit 240 is controlled by the control unit 210 and supplies an AC power to the vehicle 100 via the AC power cable 600 and the charging connector 510 while controlling a current value and a voltage value.

The communication unit 250 is controlled by the control unit 210 and performs power line communication with the vehicle 100 via one of the power lines 501, 502, 601, and 602. Accordingly, the communication unit 250 of the power supply device 200 and the communication unit 180 of the vehicle 100 can communicate with each other.

The vehicle 100 and the power supply device 200 perform DC charging or AC charging while transmitting and receiving data to and from each other by communication. Data which is transmitted from the vehicle 100 to the power supply device 200 includes a charging start request, an tipper-limit charging voltage value, and a command charging current value. Data which is transmitted from the power supply device 200 to the vehicle 100 includes maximum output information (such as a possible output voltage value and a possible output current value) and current output information (such as a current output voltage value and a current charging current value).

The radio communication unit 260 is controlled by the control unit 210 and performs radio communication with the vehicle 100 via an antenna 261. The radio communication unit 260 is constituted by, for example, a digital communication module (DCM).

In FIG. 1, it is assumed that the power supply device 200 is compatible with both DC charging and AC charging. However, the disclosure is not limited thereto and the power supply device 200 may be compatible with one of DC charging and AC charging. In this case, the vehicle 100 can be compatible with DC charging or AC charging of the power supply device 200 as long as the charging standard thereof matches that of the power supply device 200.

Figure 2:
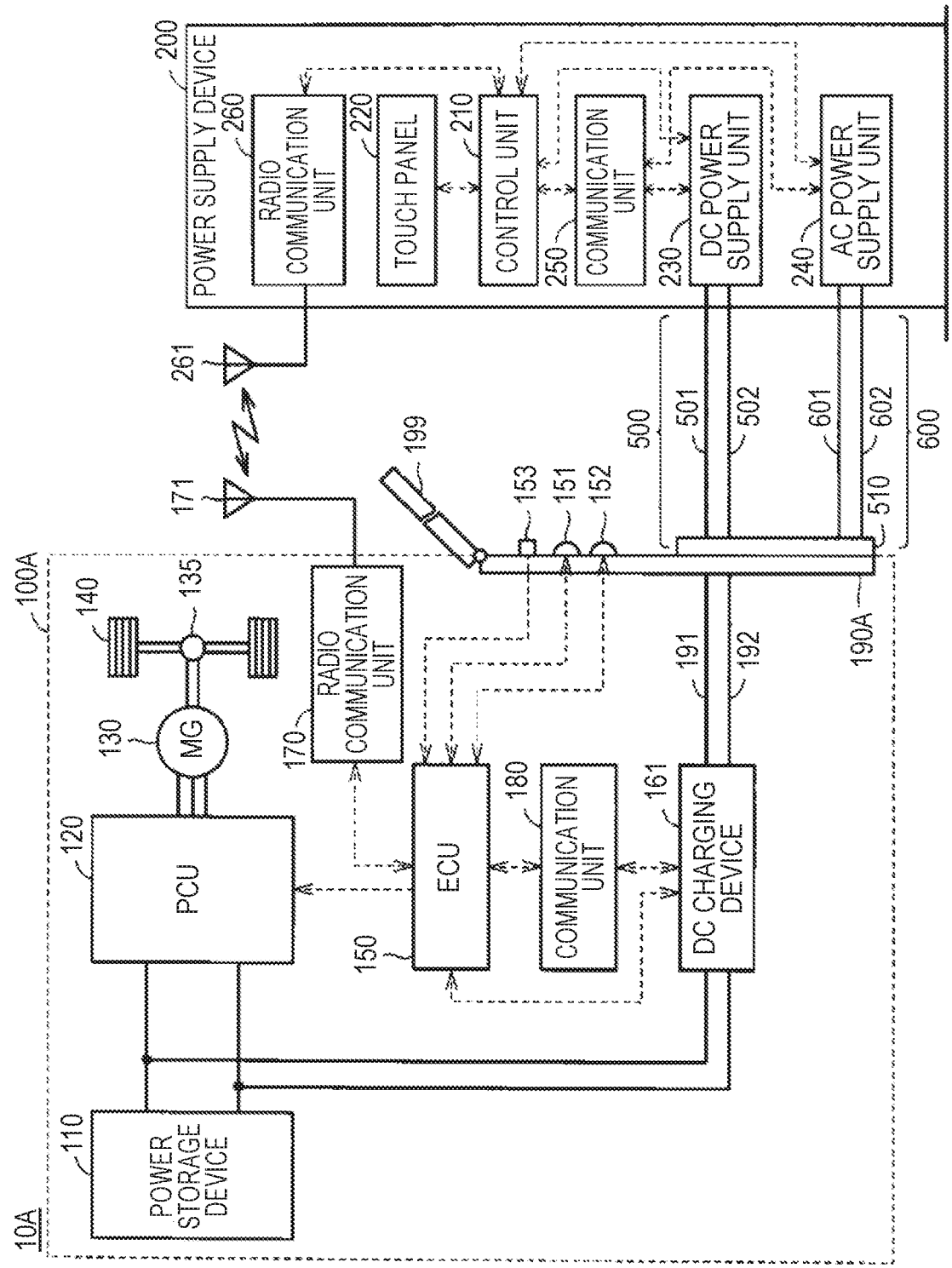
FIG. 2 is a second diagram schematically illustrating the entire configuration of a charging system according to an embodiment.

Recently, as the vehicle 100 illustrated in FIG. 1, a vehicle 100A having an AC charging function as an option has been considered. FIG. 2 is a second diagram schematically illustrating the entire configuration of a charging system 10A according to an embodiment. Referring to FIG. 2, the vehicle 100A illustrated in FIG. 2 has a configuration in which the AC charging device 162 and the power lines 193 and 194 are excluded from the vehicle 100 illustrated in FIG. 1. A charging inlet 190A of the vehicle 100A is different from the charging inlet 190 of the vehicle 100 in that the power lines 193 and 194 are not connected thereto. On the other hand, the shape of the charging inlet 190A is the same as the charging inlet 190 of the vehicle 100.

In this way, by using the AC charging function as an option, a user can select whether there is an AC charging function at the time of purchase of the vehicle 100 or 100A, can cope with various power supply methods to improve convenience when it is selected that there is an AC charging function, and can purchase the vehicle 100A at a low cost when it is selected that there is no AC charging function.

Even when the AC charging function is provided as an option, the charging inlet 190 or 190A is shared regardless of the AC charging function and thus a manufacturer of the vehicle 100 or 100A can prevent an increase in manufacturing cost in comparison with a case in which it is not shared.

Here, when the AC charging function is provided as an option and the charging inlet 190 or 190A is shared regardless of the AC charging function and when a user selects that there is no AC charging function, the AC charging device 162 is not provided and AC charging is not possible, but there is concern that a user will erroneously connect the charging connector 510 of the power supply device corresponding to only AC charging to the charging inlet 190A.

Therefore, the vehicle 100 or 100A according to this embodiment includes the charging inlet 190 or 190A corresponding to both the AC charging connector and the DC charging connector, the power storage device 110, at least one charging device of the AC charging device 162 and the DC charging device 161 that can charge the power storage device 110 with at least one of an AC power and a DC power which are input from the charging inlet 190 or 190A, and the ECU 150 that outputs a notification signal for notifying whether the charging device is compatible with AC charging.

Accordingly, it is notified whether the charging device of the vehicle 100 or 100A is compatible with AC charging. As a result, it is possible to prevent a user from erroneously connecting the charging connector 510 to the charging inlet 190A which is not compatible with AC charging for the purpose of AC charging. It is also possible to prevent a user from erroneously connecting the charging connector corresponding to only AC charging to the charging inlet 190A which is not compatible with AC charging.

Figure 3:
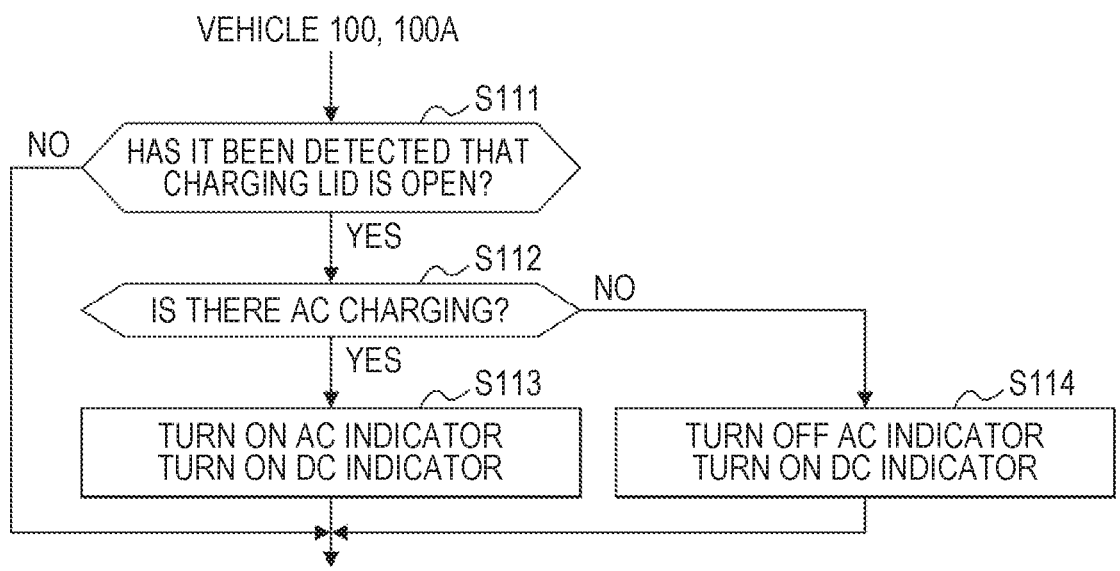
FIG. 3 is a flowchart illustrating a flow of processes which is performed in a first embodiment.

FIG. 3 is a flowchart illustrating a flow of processes which are performed in a first embodiment. This flow of processes is periodically called and performed by a main routine which is performed by the ECU 150 of the vehicle 100 or 100A. The flow of processes illustrated in FIG. 3 is performed in any of the vehicles 100 and 100A. Referring to FIG. 3, the ECU 150 of the vehicle 100 or 100A determines whether the charging lid 199 is open by determining whether a detection signal from the opening/closing sensor 153 of the charging lid 199 indicates that the charging lid 199 is open (Step S111).

When it is determined that the charging lid 199 is open (YES in Step S111), the ECU 150 determines whether there is an AC charging function (Step S112). Whether there is an AC charging function can be determined, for example, by storing a flag indicating whether there is an AC charging function in the memory of the ECU 150 at the time of manufacturing the vehicle 100 or 100A and ascertaining the flag.

Whether there is an AC charging function may be determined using other methods, and may be determined, for example, by determining whether communication with the AC charging device 162 by CAN communication is possible. Specifically, information for ascertaining whether the AC charging device 162 is connected is transmitted from the ECU 150 to the AC charging device 162 by CAN communication, it is determined that the AC charging device 162 is not connected when information indicating that the AC charging device 162 is connected is not returned from the AC charging device 162 within a predetermined time, and its determined that the AC charging device 162 is connected when the information is returned within the predetermined time.

When it is determined that there is an AC charging function (YES in Step S112), the ECU 150 turns on the AC charging indicator 151 (an ON state) and turns on the DC charging indicator 152 (an ON state) (Step S113). After Step S113, when the charging connector 510 is connected to the charging inlet 190 for the purpose of AC charging or DC charging, the charging connector corresponding to only DC charging is connected to the charging inlet 190 or 190A or the charging connector corresponding to only AC charging is connected to the charging inlet 190, and charging is started in response to an operation of starting charging.

FIG. 4 is a diagram illustrating a notification mode in the charging inlet 190 when there is an AC charging function according to the first embodiment. Referring to FIG. 4, the charging inlet 190 includes an AC charging inlet portion 195, a DC charging inlet portion 196, an AC charging indicator 151, and a DC charging indicator 152. The AC charging indicator 151 and the DC charging indicator 152 may not be particularly limited as long as they can notify a user whether there is an AC charging function and whether there is a DC charging function, and each thereof is constituted by, for example, one light emitting diode (LED) lamp. When there is an AC charging function, both the AC charging indicator 151 and the DC charging indicator 152 are turned on as illustrated in FIG. 4.

Referring back to FIG. 3, when it is determined that there is no AC charging function (NO in Step S112), the ECU 150 turns off the AC charging indicator 151 (an OFF state) and turns on the DC charging indicator 152 (the ON state) (Step S114). After Step S114, the charging connector 510 is connected to the charging inlet 190 or 190A for the purpose of DC charging or a charging connector corresponding to only DC charging is connected to the charging inlet 190 or 190A, charging is started in response to an operation of starting charging.

Figure 5:
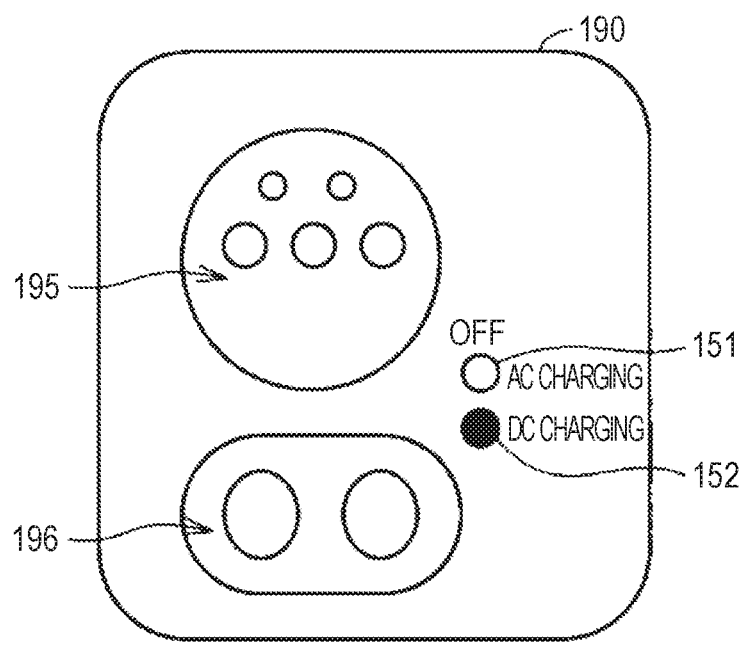
FIG. 5 is a diagram illustrating a notification mode using the charging inlet when there is no AC charging function according to the first embodiment.

FIG. 5 is a diagram illustrating a notification mode in the charging inlet 190 when there is no AC charging function according to the first embodiment. Referring to FIG. 5, when there is no AC charging function, the AC charging indicator 151 is turned off and the DC charging indicator 152 is turned on as illustrated in FIG. 5.

Figure 6:
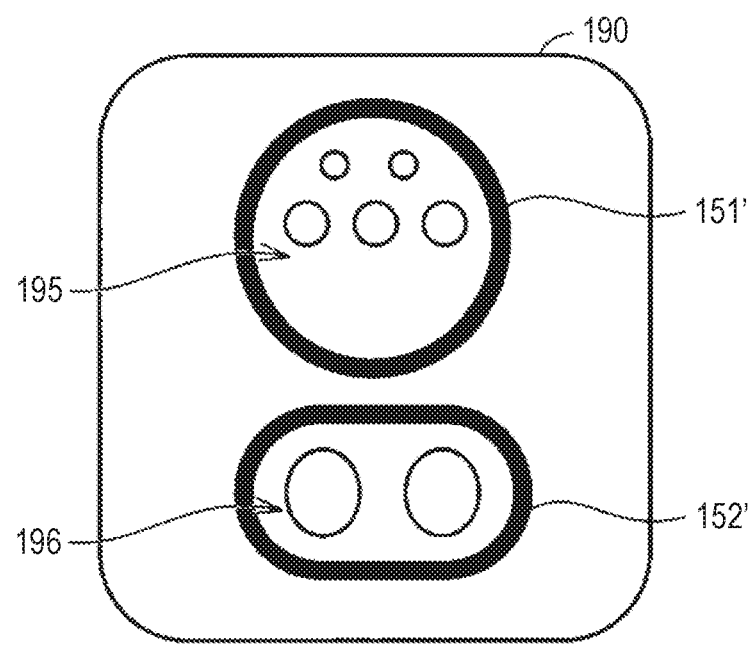
FIG. 6 is a diagram illustrating a modified example of a notification mode using the charging inlet when there is an AC charging function according to the first embodiment.

FIG. 6 is a diagram illustrating a modified example of a notification mode in the charging inlet 190 when there is an AC charging function according to the first embodiment. Referring to FIG. 6, the AC charging indicator 151 and the DC charging indicator 152 are constituted by LED lamps in FIG. 4, but are constituted by an AC charging light-emitting portion 151' and a DC charging light-emitting portion 152' which are formed to surround the AC charging inlet portion 195 and the DC charging inlet portion 196 with light-emitting portions in FIG. 6. The AC charging light-emitting portion 151' and the DC charging light-emitting portion 152' may emit light using an LED or may emit light using another method.

When there is an AC charging function, both of the AC charging light-emitting portion 151' and the DC charging light-emitting portion 152' are turned on as illustrated in FIG. 6.

Figure 7:
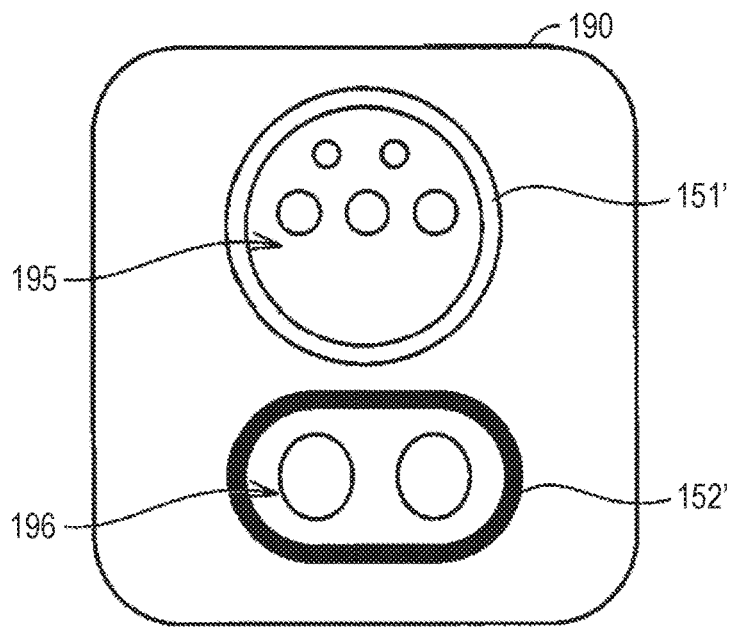
FIG. 7 is a diagram illustrating a modified example of a notification mode using the charging inlet when there is no AC charging function according to the first embodiment.

FIG. 7 is a diagram illustrating a modified example of a notification mode in the charging inlet 190 when there is no AC charging function according to the first embodiment. Referring to FIG. 7, when there is no AC charging function, the AC charging light-emitting portion 151' is turned off and the DC charging light-emitting portion 152' is turned on as illustrated in FIG. 7.

In the first embodiment, the vehicle 100 or 100A side notifies whether the vehicle 100 or 100A has an AC charging function. In a second embodiment, the power supply device 200 side notifies whether the vehicle 100 or 100A has an AC charging function.

Figure 8:
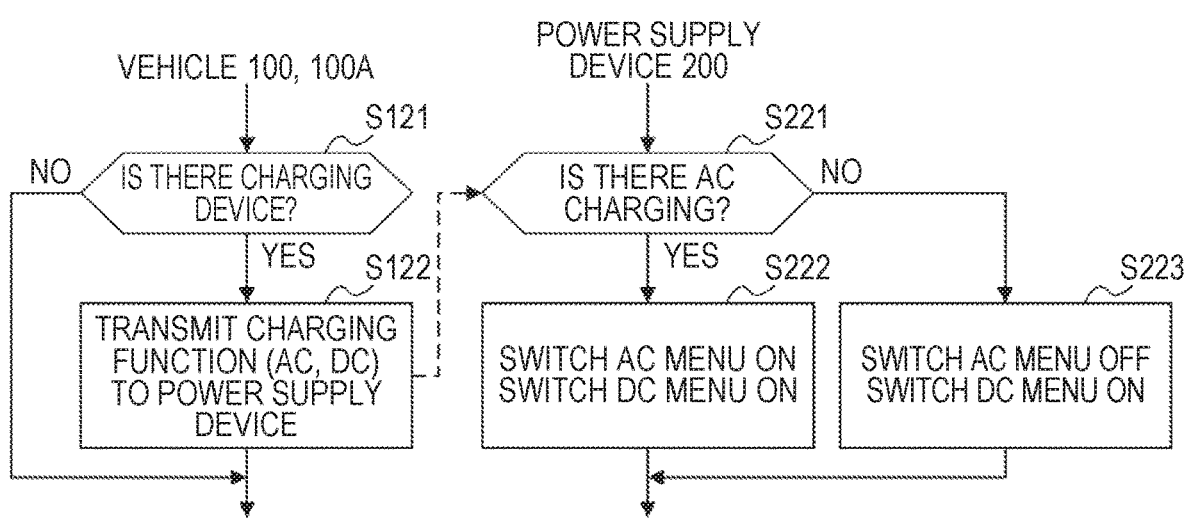
FIG. 8 is a flowchart illustrating a flow of processes which is performed in a second embodiment.

FIG. 8 is a flowchart illustrating a flow of processes which are performed in the second embodiment. This flow of processes is periodically called and performed by a main routine which is performed by the ECU 150 of the vehicle 100 or 100A. The same processes as illustrated in FIG. 8 are performed by both the vehicles 100 and 100A. Referring to FIG. 8, when the vehicle 100 or 100A is parked, the ECU 150 of the vehicle 100 or 100A determines whether a power supply device 200 is located near (Step S121). Whether the power supply device 200 is located near is determined, for example, by transmitting an inquiry signal with a radio field intensity with which radio waves can reach several meters from the radio communication unit 170 to the power supply device 200 and determining whether a response signal in response to the inquiry signal has been received from the power supply device 200.

When it is determined that the power supply device 200 is located near (YES in Step S121), the ECU 150 controls the radio communication unit 170 such that information indicating whether the vehicle 100 or 100A has an AC charging function is wirelessly transmitted to the power supply device 200 (Step S122).

The control unit 210 of the power supply device 200 determines whether the vehicle 100 or 100A has an AC charging function based on information on the charging function received from the vehicle 100 or 100A by the radio communication unit 260 (Step S221).

When it is determined that there is an AC charging function (YES in Step S221), the control unit 210 displays a menu screen (an AC charging menu is in the ON state and a DC charging menu is in the ON state) corresponding to a case in which there is an AC charging function on the touch panel 220 (Step S222). "An AC charging menu is in the ON states" refers to a state in which an AC charging menu including a choice for AC charging is displayed and the choice can be selected. "A DC charging menu is in the ON state" refers to a state in which a DC charging menu including a choice for DC charging is displayed and the choice can be selected.

Figure 9:
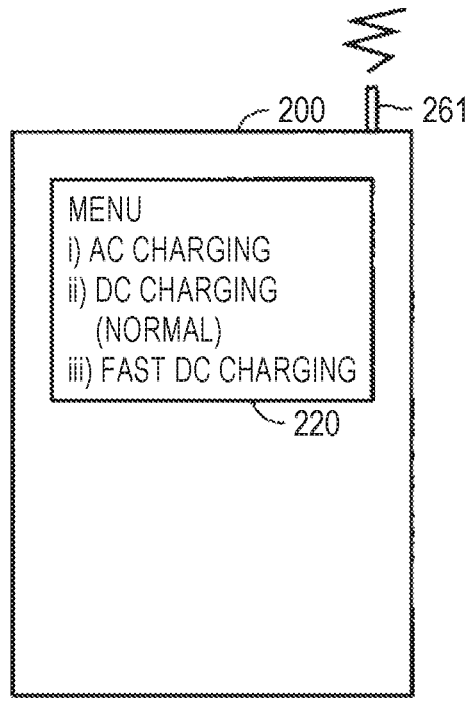
FIG. 9 is a diagram illustrating a menu screen in a power supply device when there is an AC charging function according to the second embodiment.

FIG. 9 is a diagram illustrating a menu screen in the power supply device 200 when there is an AC charging function in the second embodiment. Referring to FIG. 9, when the vehicle 100 has an AC charging function, a menu screen including a choice for selecting AC charging is displayed on the touch panel 220 as illustrated in FIG. 9.

Referring back to FIG. 8, when it is determined that there is no AC charging function (NO in Step S221), the control unit 210 displays a menu screen (an AC charging menu is in the OFF state and a DC charging menu is in the ON state) corresponding to a case in which there is no AC charging function on the touch panel 220 (Step S223). "An AC charging menu is in the OFF state" refers to a state in which an AC charging menu including a choice for AC charging is not displayed and the choice cannot be selected. After Steps S222 and S223, when an appropriate charging connector 510 is connected to the charging inlet 190 or 190A of the vehicle 100 or 100A, charging is started in response to an operation of starting charging.

Figure 10:
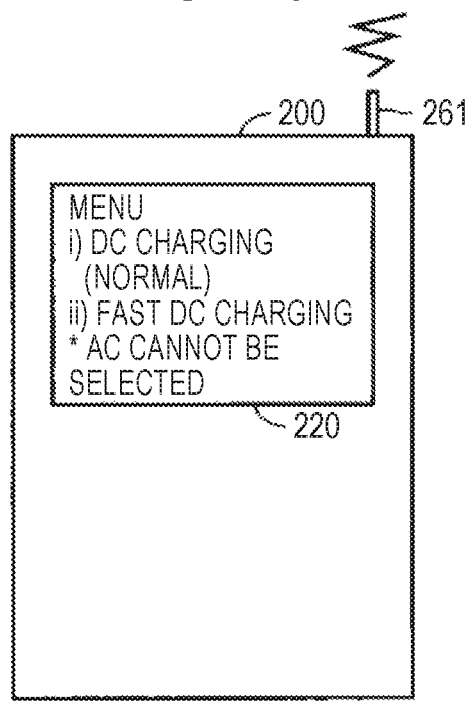
FIG. 10 is a diagram illustrating a menu screen in the power supply device when there is no AC charging function according to the second embodiment.

FIG. 10 is a diagram illustrating a menu screen in the power supply device 200 when there is no AC charging function in the second embodiment. Referring to FIG. 10, when the vehicle 100A has no AC charging function, a menu screen not including a choice for selecting AC charging is displayed on the touch panel 220 as illustrated in FIG. 10.

Accordingly, a user can select AC charging with the power supply device 200 when the vehicle 100 has an AC charging function, and cannot select AC charging with the power supply device 200 when the vehicle 100A has not AC charging function.

In the first embodiment and the second embodiment, notification of a charging mode before the charging connector 510 is connected to the charging inlet 190 or 190A has been described. In a third embodiment, notification of a charging mode after the charging connector 510 is connected to the charging inlet 190 or 190A will be described.

Figure 11:
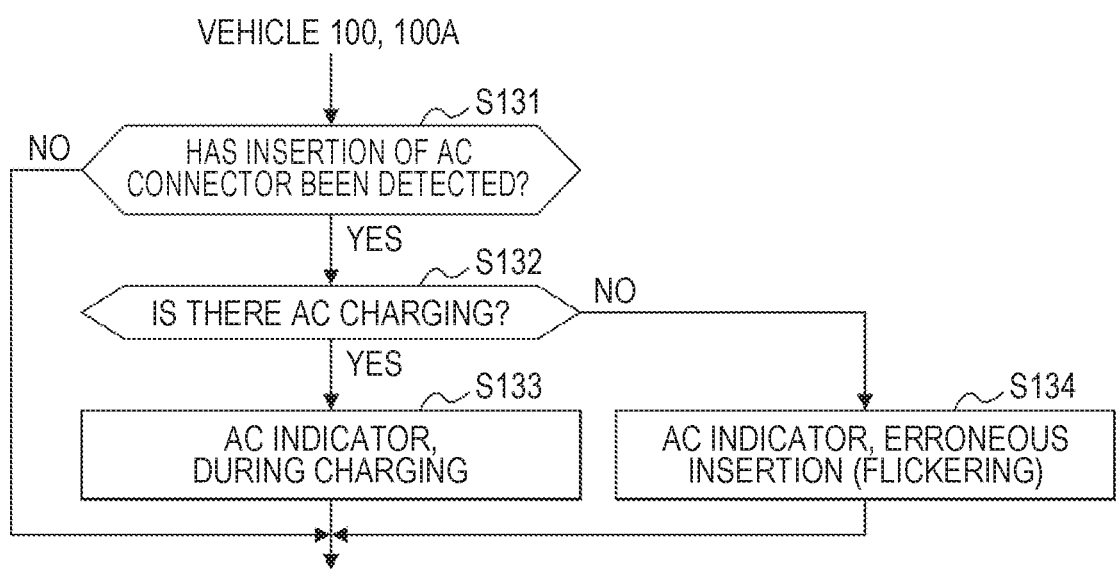
FIG. 11 is a flowchart illustrating a flow of processes which is performed in a third embodiment.

FIG. 11 is a flowchart illustrating a flow of processes which are performed in the third embodiment. This flow of processes is periodically called and performed by a main routine which is performed by the ECU 150 of the vehicle 100 or 100A. The same processes as illustrated in FIG. 11 are performed by both of the vehicles 100 and 100A. Referring to FIG. 11, the ECU 150 of the vehicle 100 or 100A determines whether a charging connector 510A (see FIGS. 12 and 13 which will be described later) corresponding to only AC charging is inserted into the charging inlet 190 or 190A (Step S131). Whether the charging connector 510A corresponding to only AC charging has been inserted is determined, for example, by determining whether a change in state of a signal line for detecting connection of the AC power cable 600 (for example, a change from a state in which no current flows to a state in which a current flows) has been detected.

Whether the charging connector 510A corresponding to only AC charging has been inserted is not limited thereto and can be determined, for example, by determining whether the ECU 150 of the vehicle 100 or 100A is able to communicate with a power supply device by power line communication in accordance with a protocol of the CCS standard and a signal indicating correspondence to only AC charging has been received.

When it is determined that the charging connector 510A corresponding to only AC charging, has been inserted (YES in Step S131), the ECU 150 determines whether the vehicle 100 or 100A has an AC charging function (Step 132). The determination of Step S132 can be performed in the same way as in Step S112 of FIG. 3 in the first embodiment.

When it is determined that there is an AC charging function (YES in Step S132), the ECU 150 notifies a user that AC charging is being performed by changing the DC charging indicator 152 from the ON state to the OFF state in a state in which the AC charging indicator 151 is maintained in the ON state (Step S133).

FIG. 12 is a diagram illustrating a notification mode in the charging inlet 190 when there is an AC charging function in the third embodiment. Referring to FIG. 12, when there is an AC charging function, both of the AC charging indicator 151 and the DC charging indicator 152 are in the ON state as illustrated in FIG. 4 in the first embodiment before the charging connector 510A corresponding to only AC charging is inserted. When the charging connector 510A corresponding to only AC charging is inserted, the AC charging indicator 151 is switched to the ON state and the DC charging indicator 152 is switched to the OFF state to indicate that AC charging is being performed as illustrated in FIG. 12.

Referring back to FIG. 11, when it is determined that there is no AC charging function (NO in Step S132), the ECU 150 notifies a user that there is no AC charging function and the charging connector 510A corresponding to only AC charging is erroneously inserted by changing the AC charging indicator 151 from the OFF state to a flickering state and changing the DC charging indicator 152 from the ON state to the OFF state (Step S134).

FIG. 13 is a diagram illustrating a notification mode in the charging inlet 190 when there is no AC charging function in the third embodiment. Referring to FIG. 13, when there is no AC charging function, the AC charging indicator 151 is in the OFF state and the DC charging indicator 152 is in the ON state as illustrated in FIG. 5 in the first embodiment before the charging connector 510A corresponding to only AC charging is inserted. When the charging connector 510A corresponding to only AC charging is inserted, the AC charging indicator 151 is switched to the flickering state and the DC charging indicator 152 is switched to the OFF state to indicate that the charging connector 510A corresponding to only AC charging is erroneously inserted as illustrated in FIG. 13.

In the above-mentioned embodiments, it is assumed that the vehicle 100 or 100A is a motor-driven vehicle not including an engine but including a motor generator. However, the disclosure is not limited thereto. The vehicle 100 or 100A has only to be a vehicle including a charging inlet and capable of being charged and may be, for example, a plug-in hybrid vehicle including an engine and a motor generator.

In the above-mentioned embodiments, whether a vehicle is compatible with AC charging is notified by display with the AC charging indicator 151 of the vehicle 100 or 100A illustrated in FIGS. 4, 5, 12, and 13, display with the AC charging light-emitting portion 151' of the vehicle 100 or 100A illustrated in FIGS. 6 and 7, and display with the touch panel 220 in the power supply device 200 illustrated in FIGS. 9 and 10. However, the disclosure is not limited to notification with such display and notification may be performed using another method. For example, notification may be performed by sound which is output from a speaker provided in the vicinity of the charging inlet 190 or 190A (for example, in the charging lid 199) or the like.

In the second embodiment, the vehicle 100 or 100A wirelessly transmits information indicating whether the vehicle has an AC charging function to the power supply device 200. However, the disclosure is not limited thereto and, for example, information indicating whether there is an AC charging function may be transmitted from the vehicle 100 or 100A to the power supply device 200 by wired communication such as power line communication via the DC power cable 500 or the AC power cable 600 after the charging connector 510 is connected to the charging inlet 190 or 190A.

In the second embodiment, whether there is a power supply device 200 near is determined by transmitting an inquiry signal from the radio communication unit 170 to the power supply device 200 with a radio field intensity with which radio waves can reach about several meters and determining whether a response signal to the inquiry signal has been received from the power supply device 200. However, the disclosure is not limited thereto and whether a power supply device 200 is near may be determined using another method.

For example, an inquiry signal is transmitted using a communication method in which radio signals can reach several kilometers or more. A response signal to the inquiry signal is transmitted from the power supply device 200 to the vehicle 100 or 100A. The response signal may include position information of the power supply device 200 and information indicating a charging mode (AC charging or DC charging and a charging standard) to which the power supply device 200 can correspond. Whether the power supply device 200 is near may be determined by determining whether a position of the power supply device 200 indicated by the position information included in the response signal is within a predetermined distance with which it can be determined that the power supply device 200 is near from the vehicle 100 or 100A. When the vehicle 100 or 100A is compatible with the charging mode of the power supply device 200 indicated by the information included in the response signal, it may be determined that the power supply device 200 is near. A user may be notified of a route to the power supply device 200 with a navigation device of the vehicle 100 or 100A using the position information of the power supply device 200 included in the response signal.

In the above-mentioned embodiments, the ECU 150 controls the AC charging indicator 151 and the DC charging indicator 152. However, the disclosure is not limited thereto and the lamps may be controlled using a relay based on an output of the opening/closing sensor 153 of the charging lid 199.

That is, when a vehicle 100 has both of a DC charging function and an AC charging function, a relay for controlling whether a current has to flow in the DC charging indicator 152 and the AC charging indicator 151 based on a signal from the opening/closing sensor 153 may be provided in the vehicle 100. When the opening/closing sensor 153 is outputting a signal indicating opening of the charging lid 199, the relay is turned on to turn on both of the DC charging indicator 152 and the AC charging indicator 151. That is, when the charging device is compatible with AC charging, the opening/closing sensor 153 and the relay output a signal for notifying that the charging device is compatible with AC charging.

On the other hand, when a vehicle 100A has only a DC charging function, a relay for controlling whether a current has to flow in the DC charging indicator 152 based on a signal from the opening/closing sensor 153 may be provided in the vehicle 100A. When the opening/closing sensor 153 is outputting a signal indicating opening of the charging lid 199, the relay is turned on to turn on only the DC charging indicator 152 and to maintain the AC charging indicator 151 in the OFF state. That is, when the charging device is not compatible with AC charging, the opening/closing sensor 153 and the relay output a signal for notifying that the charging device is not compatible with AC charging.

In the vehicle 100 or 100A according to the second embodiment, as illustrated in Step S121 of FIG. 8, whether a power supply device 200 is near is determined, for example, by transmitting an inquiry signal from the radio communication unit 170 to the power supply device 200 with a radio field intensity with which radio waves can reach about several meters and determining whether a response signal to the inquiry signal has been received from the power supply device 200. However, the disclosure is not limited thereto and whether a power supply device 200 is near may be determined using another method. Whether a power supply device 200 is near may be determined by determining whether the charging connector 510 of the power supply device 200 is connected to the charging inlet 190 or 190A of the vehicle 100 or 100A.

In the second embodiment, the result of determination of whether the charging device of the vehicle 100 or 100A is compatible with AC charging is notified using the power supply device 200. However, the disclosure is not limited thereto and the result of determination of whether the charging device is compatible with AC charging can be notified by a device outside the vehicle 100 or 100A. An example of the device may be a mobile terminal such as a smartphone which is carried by a user.

In the first embodiment and the third embodiment, whether the charging device of the vehicle 100 or 100A is compatible with AC charging is displayed in the vicinity of the charging inlet 190 or 190A of the vehicle 100 or 100A. However, the disclosure is not limited thereto and whether the charging device is compatible with AC charging may be notified using a device outside the vehicle 100 or 100A (for example, a mobile terminal such as a smartphone which is carried by a user).

The above-mentioned embodiments can be independently embodied and may also embodied in an appropriate combination thereof.

As illustrated in FIGS. 1 and 2, the vehicle 100 or 100A includes a charging inlet 190 or 190A that is compatible with both an AC charging connector and a DC charging connector, a power storage device 110, and a charging device (the DC charging device 161 and the AC charging device 162) that can charge the power storage device 110 with at least one of an AC power and a DC power which are input from the charging inlet 190 or 190A. As illustrated in FIGS. 3, 8, and 11, the vehicle 100 or 100A includes an output unit that outputs a notification signal for notifying whether the charging device is compatible with AC charging.

Specifically, the output unit in the first embodiment is the ECU 150 and the notification signal is a control signal for turning on or off the AC charging indicator 151, which is output from the ECU 150 to the AC charging indicator 151 in Steps S113 and S114 of FIG. 3. The output unit in the second embodiment is the ECU 150 and the notification signal is a signal indicating information for switching the AC menu to the ON state or the OFF state, which is output from the ECU 150 to the power supply device 200 in Step S122 of FIG. 8, where the information indicates whether the vehicle 100 or 100A has an AC charging function. The output unit in the third embodiment is the ECU 150 and the notification signal is a control signal for turning on, flickering, or turning off the AC charging indicator 151, which is output from the ECU 150 to the AC charging indicator 151 in Steps S133 and S134 of FIG. 11. An output unit in a modified example is a relay and the notification signal is a control signal for turning on or off the AC charging indicator 151, which is output from the relay.

Accordingly, whether the charging device of the vehicle 100 or 100A is compatible with AC charging is notified. As a result, it is possible to prevent a user from erroneously connecting the charging connector 510 to the charging inlet 190A which is not compatible with AC charging for the purpose of AC charging. It is also possible to prevent a user from erroneously connecting the charging connector corresponding to only AC charging to the charging inlet 190A which is not compatible with AC charging.

As illustrated in FIGS. 1 and 2, the vehicle 100 or 100A further includes the AC charging indicator 151 and the AC charging light-emitting portion 151'. As illustrated in Steps S113 and S114 of FIG. 3 and Steps S133 and S134 of FIG. 11, the output unit outputs a control signal for notifying whether the charging device is compatible with AC charging using the AC charging indicator 151 and the AC charging light-emitting portion 151' based on the result of determination of whether the charging device is compatible with AC charging.

Accordingly, whether the charging device is compatible with AC charging is notified using the AC charging indicator 151 and the AC charging light-emitting portion 151' based on the result of determination of whether the charging device is compatible with AC charging. As a result, it is possible to prevent a user from erroneously connecting the charging connector 510 to the charging inlet 190A which is not compatible with AC charging for the purpose of AC charging. It is also possible to prevent a user from erroneously connecting the charging connector corresponding to only AC charging to the charging inlet 190A which is not compatible with AC charging.

As illustrated in Step S122 of FIG. 8, the ECU 150 outputs a notification signal for notifying the result of determination of whether the charging device is compatible with AC charging using the power supply device 200 (Steps S222 and S223) to the power supply device 200.

Accordingly, the result of determination of whether the charging device is compatible with AC charging is notified using the power supply device 200. As a result, it is possible to prevent a user from erroneously connecting the charging connector 510 to the charging inlet 190A which is not compatible with AC charging for the purpose of AC charging. It is also possible to prevent a user from erroneously connecting the charging connector corresponding to only AC charging to the charging inlet 190A which is not compatible with AC charging.

As illustrated in FIGS. 1 and 2, the vehicle 100 or 100A includes the AC charging indicator 151. As illustrate in Step S131 of FIG. 11, the ECU 150 detects connection of the charging connector corresponding to only AC charging to the charging inlet 190 or 190A. As illustrated in Steps S131 to S134 of FIG. 11, the ECU 150 outputs a control signal for notifying that the charging connector corresponding to only AC charging is erroneously connected using the AC charging indicator 151 when the charging device is not compatible with AC charging and connection of the charging connector corresponding to only AC charging is detected.

Accordingly, when the charging device is not compatible with AC charging and connection of the charging connector corresponding to only AC charging is detected, it is notified that the charging connector corresponding to only AC charging is erroneously connected using the AC charging indicator 151. As a result, it is possible to notify a user that the user has erroneously connected the charging connector 510 to the charging inlet 190A which is not compatible with AC charging for the purpose of AC charging. It is also possible to notify a user that the user has erroneously connected the charging connector corresponding to only AC charging to the charging inlet 190A which is not compatible with AC charging.

As illustrated in FIGS. 1 and 2, the charging system 10 includes the power supply device 200 for charging the vehicle 100 or 100A. As illustrated in FIGS. 1 and 2, the vehicle 100 or 100A includes a charging inlet 190 or 190A that is compatible with both an AC charging connector and a DC charging connector, a power storage device 110, and a charging device (the DC charging device 161 and the AC charging device 162) that can charge the power storage device 110 with at least one of an AC power and a DC power which are input from the charging inlet 190 or 190A. As illustrated in FIG. 8, the vehicle 100 or 100A includes the ECU 150 and the radio communication unit 170 that outputs a notification signal for notifying whether the charging device is compatible with AC charging to the power supply device 200. As illustrated in Steps S222 and S223 of FIG. 8, the power supply device 200 includes the control unit 210 and the touch panel 220 that notifies whether the vehicle 100 or 100A is compatible with AC charging based on the notification signal from the vehicle 100 or 100A.

Accordingly, whether the vehicle 100 or 100A is compatible with AC charging is notified by the power supply device 200. As a result, it is possible to prevent a user from erroneously connecting the charging connector 510 to the charging inlet 190A which is not compatible with AC charging for the purpose of AC charging. It is also possible to prevent a user from erroneously connecting the charging connector corresponding to only AC charging to the charging inlet 190A which is not compatible with AC charging.

It should be understood that the embodiments disclosed herein are exemplary but are not restrictive in all respects. The scope of the disclosure is not limited to description of the above-mentioned embodiments but is defined by the appended claims, and is intended to include all modifications within meanings and scopes equivalent to the claims.

What is claimed is:

1. A vehicle comprising:
  a charging inlet that is compatible with both an alternating-current charging connector and a direct-current charging connector;
  a power storage device;
  a charging device configured to charge the power storage device with at least one of an alternating-current power which are input from the charging inlet and a direct-current power which are input from the charging inlet; and
  an output device configured to output a notification signal for notifying whether the charging device is compatible with alternating-current charging, a notification device is positioned within the charging inlet and displays the notification signal, the alternating-current charging being charging of the power storage device with the alternating-current power.

2. The vehicle according to claim 1, wherein the output device is configured to output the notification signal for notifying whether the charging device is compatible with the alternating-current charging using the notification device based on a result of determination of whether the charging device is compatible with the alternating-current charging.

3. The vehicle according to claim 1, wherein
  the output device is configured to output the notification signal for notifying whether the charging device is compatible with the alternating-current charging using an external device to the external device based on a result of determination of whether the charging device is compatible with the alternating-current charging.

4. The vehicle according to claim 1, wherein
  the output device is configured to detect connection of the alternating-current charging connector to the charging inlet, and
  wherein the output device is configured to output the notification signal for notifying that the alternating-current charging connector is erroneously connected using the notification device when the charging device is not compatible with the alternating-current charging and the output device detects connection of the alternating-current charging connector.

5. A charging system comprising:
  a vehicle including a charging inlet, a power storage device, a charging device, and an output device, the charging inlet being compatible with both an alternating-current charging connector and a direct-current charging connector, the charging device being configured to charge the power storage device with at least one of an alternating-current power which are input from the charging inlet and a direct-current power which are input from the charging inlet; and
  a charging stand configured to charge the vehicle,
  the output device being configured to output a notification signal for notifying whether the charging device is compatible with alternating-current charging to the charging stand, the alternating-current charging being charging of the power storage device with the alternating-current power, and
  the charging stand including a notification device positioned within the charging inlet and configured to notify whether the vehicle is compatible with the alternating-current charging based on the notification signal from the vehicle.

6. A vehicle comprising:
  a charging inlet that is compatible with both an alternating-current charging connector and a direct-current charging connector;
  a power storage device;
  a charging device configured to charge the power storage device with at least one of an alternating-current power which are input from the charging inlet and a direct-current power which are input from the charging inlet; and
  an output device configured to output a notification signal for notifying whether the charging device is compatible with alternating-current charging, a notification device is positioned within the charging inlet and displays the notification signal via an AC charging indicator and a DC charging indicator, the alternating-current charging being charging of the power storage device with the alternating-current power.

7. The vehicle according to claim 6, wherein the output device is configured to output the notification signal for notifying whether the charging device is compatible with the alternating-current charging using the notification device based on a result of determination of whether the charging device is compatible with the alternating-current charging.

8. The vehicle according to claim 6, wherein
  the output device is configured to output the notification signal for notifying whether the charging device is compatible with the alternating-current charging using an external device to the external device based on a result of determination of whether the charging device is compatible with the alternating-current charging.

9. The vehicle according to claim 6, wherein the output device is configured to detect connection of the alternating-current charging connector to the charging inlet, and wherein the output device is configured to output the notification signal for notifying that the alternating-current charging connector is erroneously connected using the notification device when the charging device is not compatible with the alternating-current charging and the output device detects connection of the alternating-current charging connector.

* * * * *